(No Model.)
N. C. DECKER.
CULTIVATOR.
No. 269,564. Patented Dec. 26, 1882.
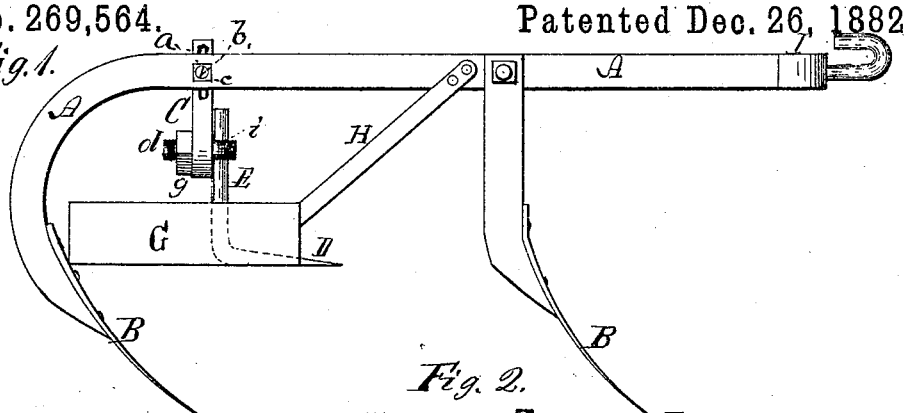
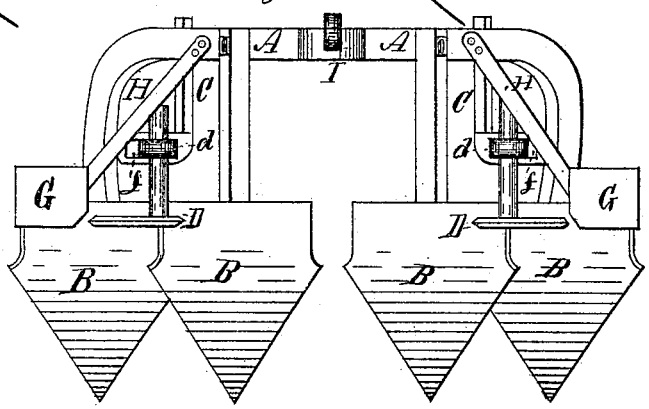
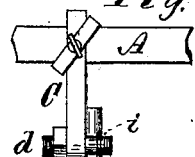
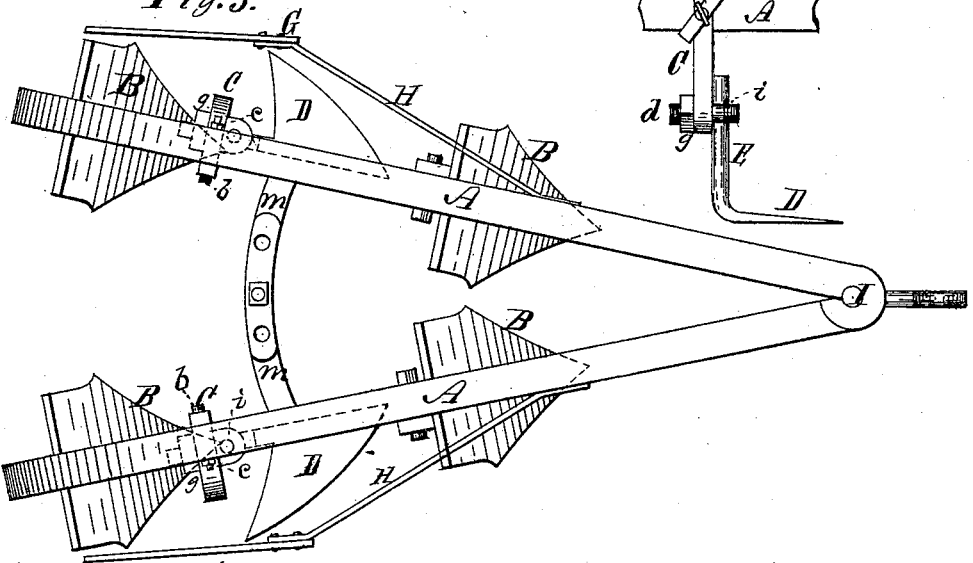
WITNESSES
W. N. Jones.
A. J. Brown.
INVENTOR
Nicholas C. Decker,
J. B. Lawyer, Attorney.

UNITED STATES PATENT OFFICE.

NICHOLAS C. DECKER, OF WINDSOR, MISSOURI.

CULTIVATOR.

SPECIFICATION forming part of Letters Patent No. 269,564, dated December 26, 1882.

Application filed September 27, 1882. (No model.)

*To all whom it may concern:*

Be it known that I, NICHOLAS C. DECKER, a citizen of the United States, residing at Windsor, in the county of Henry and State of Missouri, have invented certain new and useful Improvements in Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification—

Figure 1 being a side view of a cultivator containing my improvements; Fig. 2, a front view of the same; Fig. 3, a top view of the same; Fig. 4, a view showing a modification of the attachment of the bar C to the beam A.

Like letters designate corresponding parts in all the figures.

It is very desirable to turn up the soil quite deeply between the rows to kill the weeds and expose the soil, and at the same time to loosen the earth which is in contact with the stalks.

My invention consists in certain attachments to ordinary cultivators which will loosen the earth to any desired depth close to the plants and remove the weeds there at the same time that the soil between the rows is being cultivated.

The drawings show my improvements attached to an ordinary double-beamed cultivator, whose two beams, A A, each of which is furnished with two shovels, B B, are hinged at I and connected at $m$ $m$ in the manner shown, or by any other suitable means, by which the cultivator is adjusted to suit any width between the rows at which the corn, tobacco, or other plants may be planted. To each beam, on the inner side, are attached right-angled bars C C. These bars are provided on the vertical and longer arms with slots $a$ $a$—say six inches long—to receive bolts $b$ $b$, and the bars C C are firmly clasped to the beams A A by nuts $c$ $c$. These slots permit the vertical adjustment of knives D D, so as to loosen the soil at any desired depth.

The knives D D are preferably of triangular shape, though any other suitable shape may be employed. They are made so as to run nearly parallel with the surface of the soil and just under it, and by adjustment may work under the soil to any desired depth. The cutting-edges of the knives are on the sides next to the rows, and the sharp point of each blade is at the forward end thereof, so as to cut the more easily under the ground.

At the rear end of the blade, and on the side next to the central line of the cultivator, the blade is welded to a shank, E, placed at an angle a little greater than a right angle to it. This shank may be of one piece with the knife, as shown in the drawings, or may be separate and attached to it by any suitable means. This shank is attached to the horizontal arm of the bar C by means of a bolt, $d$, and nut $g$. The bolt $d$ is provided with an aperture, $i$, through which the shank passes.

The lower arm of the bar C is provided with a horizontal slot, $f$, say, six inches in length, to receive the bolt $d$, which passes through it, and by means of which and the nut $g$ the shank E is securely fastened to the bar C. The slot $f$ permits the lateral adjustment of the knife D, thus enabling the knife to cut within any required distance of the stalks. The bar C is so situated on the beam A as to bring the knife D about six inches (more or less) in front of the outward shovel, B.

The modification shown in Fig. 4 represents another device for securing each bar C to the beam so as to be adjustable vertically. A simple oblique clamp, $h$, embraces both the bar and the beam, and the bar is tightened in position by a thumb-screw, $i$. The knives D D may also be adjusted independently of the adjustment of the bars C C by sliding up or down in the bolt $d$ of the nut $g$, being loosened for the purpose.

To prevent the knives D D from cutting or otherwise injuring the stalks when it is desired to cut quite closely to the stalks, guards G G are provided. These guards are connected with the beams A A by bars H H, and are fixed so as to just clear the surface of the soil, and extend out just beyond the farthest limit to which the knives D D can be adjusted.

I do not confine myself to the style of cultivator described, nor do I confine myself to knife-blades on both sides of the cultivator, as it may in some cases be desirable to have one blade, attached to a single-beamed cultivator.

What I claim as new, and desire to secure by Letters Patent, is—

In a cultivator, the combination, with the beams A A and shovels B B, of the horizontal knives D D, arranged to cut beneath the surface of the ground close up to the rows of plants, and made adjustable vertically and laterally outward and inward by means of the slotted angular bars C C and bolts $d\ d$, substantially as and for the purpose herein specified.

In testimony whereof I affix my signature in presence of two witnesses.

NICHOLAS C. DECKER.

Witnesses:
N. T. GRAY,
J. C. CLARK.